(12) United States Patent
Wang et al.

(10) Patent No.: US 9,155,318 B2
(45) Date of Patent: Oct. 13, 2015

(54) DEVICE AND METHOD FOR PRODUCING A BEVERAGE

(75) Inventors: Changjie Wang, Shanghai (CN); Xiaoyun Kui, Shanghai (CN); Qi Zhou, Shanghai (CN); Donghai Yu, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/113,736

(22) PCT Filed: May 14, 2012

(86) PCT No.: PCT/IB2012/052381
§ 371 (c)(1),
(2), (4) Date: Oct. 24, 2013

(87) PCT Pub. No.: WO2012/156890
PCT Pub. Date: Nov. 22, 2012

(65) Prior Publication Data
US 2014/0057032 A1 Feb. 27, 2014

(30) Foreign Application Priority Data

May 19, 2011 (WO) ................. PCT/CN2011/074311

(51) Int. Cl.
*A23C 11/10* (2006.01)
*A47J 43/044* (2006.01)
*A47J 43/07* (2006.01)

(52) U.S. Cl.
CPC ............. *A23C 11/103* (2013.01); *A47J 43/044* (2013.01); *A47J 43/0705* (2013.01); *A47J 43/0711* (2013.01)

(58) Field of Classification Search
CPC ........ A23C 11/103; A23C 11/06; A23L 1/20; A23L 1/2005; A47J 31/002; A47J 31/42
USPC .............................. 426/634, 431, 425; 99/286
See application file for complete search history.

(56) References Cited

U.S. PATENT DOCUMENTS 2,414,669 A * 1/1947 Reich ............................... 426/29
4,389,425 A 6/1983 Burr, II
(Continued)

FOREIGN PATENT DOCUMENTS

CN 101606823 A 12/2009
CN 102132738 A 7/2011
(Continued)

OTHER PUBLICATIONS

Machine Translation for RU 2160543 published Dec. 2000.*

*Primary Examiner* — Anthony Weier

(57) ABSTRACT

Described is a method of producing a beverage, including the steps of introducing a first portion of solvent into a container (11) stored with raw ingredients, the first portion of solvent having a first temperature; introducing a second portion of solvent into the container (11), the mixture of the first portion of solvent and the second portion of solvent having a second temperature that is lower than the first temperature; and grinding the raw ingredients together with the mixture of the first portion of solvent and the second portion of solvent to generate the beverage. Further described is a device (10) for producing a beverage, the device including a container (11) configured to receive raw ingredients; a solvent provider (12) arranged on the container (11) and configured to provide solvent to the raw ingredients in the container (11); a valve arranged (13) on the solvent provider (12) and configured to be controlled to open or close to allow the solvent from the solvent provider (12) to flow into the container (11) or to prevent the solvent from flowing into the container (11); a grinding mechanism (14) configured to grind the raw ingredients in the container (11) to generate the beverage; and a first heating unit (15) configured to heat the beverage.

21 Claims, 11 Drawing Sheets

(56) References Cited

U.S. PATENT DOCUMENTS

| | | | |
|---|---|---|---|
| 4,514,433 A | | 4/1985 | Matsuura |
| 4,769,243 A | * | 9/1988 | Kanisawa et al. ............... 426/33 |
| 5,852,965 A | | 12/1998 | Kim |
| 2005/0087074 A1 | | 4/2005 | Lin |
| 2005/0173571 A1 | | 8/2005 | Kim |

FOREIGN PATENT DOCUMENTS

| | | | |
|---|---|---|---|
| EP | 0100030 A2 | | 2/1984 |
| RU | 2160543 | * | 12/2000 |

\* cited by examiner

DEVICE AND METHOD FOR PRODUCING A BEVERAGE

CROSS-REFERENCE TO PRIOR APPLICATIONS

This application is the U.S. National Phase application under 35 U.S.C. §371 of International Application No. PCT/IB2012/052381, filed on May 14, 2012, which claims the benefit of WO Patent Application No. PCT/CN2011/074311, filed on May 19, 2011. These applications are hereby incorporated by reference herein.

FIELD OF THE INVENTION

The disclosure relates to a domestic appliance, particularly a device and a method for producing a beverage.

BACKGROUND OF THE INVENTION

Soy beverages, for example soy milk, have become more and more popular due to their high nutritional value, such as high protein value. In recent years, home soy milk makers have come to be widely used by people to prepare soy milk by themselves. Chinese patent application No. 200910041952.7 has disclosed a home soy milk maker that comprises a machine head, a motor arranged in the machine head, a control device, a soy milk container, a crushing device arranged on an output shaft of the motor, a heating device and a base.

With the existing home soy milk maker, soy milk can generally be prepared as follows.

First, soybeans (or soaked soybeans) and water are manually put into the soy milk container of the home soy milk maker.

Then, the home soy milk maker is started up. After the home soy milk maker has been started up, it begins to heat the water and the soybeans together to a predetermined temperature, for example 80° C.~100° C., and then grinds the soybeans at the predetermined temperature to produce the soy milk. During the grinding process, the home soy milk maker continues to heat the soy milk to the boil.

Finally, the boiled soy milk is filtered manually to remove the residue and the thus filtered soy milk is ready for consumption.

OBJECT AND SUMMARY OF THE INVENTION

As to the existing home soy milk maker, both water and soybeans have to be manually introduced into the soy milk container before the home soy milk maker is started up, that is to say, the water-adding process cannot be performed after the home soy milk has been started up and/or the soybean-adding process cannot be performed after the home soy milk has been started up, causing the process to lack flexibility and practicality.

Furthermore, during the soy milk-making process, the existing home soy milk maker normally heats the water together with the soybeans to a predetermined temperature, for example 80° C.~100° C., and then grinds the soybeans at the predetermined temperature to produce the soy milk; the reason for this being that the lipoxygenase of the soybeans will react with fat and release an unpleasant beany smell if the grinding step is performed at a temperature that is lower than 80° C. for example. However, the denaturation temperatures of soy proteins are 70° C. for the 7S protein and 90° C. for the 11S protein, which means that soy proteins of the soybeans will start the denaturation process after being heated to 70° C. If the grinding step is performed at the above, predetermined temperature, the denaturation process will decrease the solubility of soy protein, resulting in a low-soluble protein concentration in the soy milk produced. FIG. 1 shows the correlation between grinding temperature and soluble protein concentration, and the x-axis denotes the grinding temperature (° C.) and the y-axis denotes the soluble protein concentration (%). As can be seen from FIG. 1, the soluble protein concentration is highest at around 45° C. and then gradually decreases as the grinding temperature increases.

To better address the above concerns, in one aspect, an embodiment of the disclosure provides a device for producing a beverage. The device comprises a container configured to receive raw ingredients; a solvent provider arranged on the container and configured to provide solvent to the raw ingredients in the container; a valve arranged on the solvent provider and configured to be controlled to open or close to allow the solvent from the solvent provider to flow into the container or to prevent the solvent from flowing into the container; a grinding mechanism configured to grind the raw ingredients in the container to generate the beverage; and a first heating unit configured to heat the beverage.

Using this device, there is no need for introducing the solvent into the container manually before the device is started up. Instead, before the device is started up, the solvent is first poured into the solvent provider, not into the container, and when the device starts to operate, the solvent in the solvent provider is controlled to flow into the container by controlling the valve to be open or closed, which makes the solvent-adding process more flexible, thereby significantly improving ease of use(?).

Advantageously, the valve is further configured so as to be controlled to open in order to allow a first portion of solvent from the solvent provider to flow into the container, the first portion of solvent having a first temperature, and subsequently allow a second portion of solvent from the solvent provider to flow into the container, the mixture of the first portion of solvent and the second portion of solvent having a second temperature that is lower than the first temperature, and the grinding mechanism is configured to grind the raw ingredients, after the second portion of solvent has been allowed to flow into the container, so as to generate the beverage.

Advantageously, when the temperature of the first portion of solvent from the solvent provider is lower than the first temperature, the first heating unit is further configured to heat the first portion of solvent in the container to the first temperature.

Advantageously, the raw ingredients may be soybeans, black soybeans, a mixture of soybeans and vegetables, a mixture of soybeans and fruits, a mixture of soybeans and grains, or any combination of those ingredients. The solvent may be water, mineral water, tap water, alkaline water, salted water, alcohol, or any combination of those solvents.

In this embodiment, the solvent-adding process is divided into two steps. First, the first portion of solvent from the solvent provider is controlled to flow into the container. As the first portion of water that flows into the container has a first temperature or the first portion of water and the soybeans are heated together to the first temperature in the container, the lipoxygenase of the raw materials in the container becomes almost inactive, so that the beany smell is removed effectively. Then, the second portion of solvent from the solvent provider is controlled to flow into the container in order to be mixed with the first portion of solvent. The mixture of the first portion of solvent and the second portion of solvent has a second temperature that is lower than the first temperature. As the solubility of soy protein at the second temperature is higher than that at the first temperature, more protein is dissolved in the resulting beverage when the grinding mechanism grinds the soybeans in the container at the second temperature. Therefore, the device of this embodiment enables higher soy protein extraction while the good smell of the beverage is maintained.

Advantageously, the grinding mechanism is further configured to grind the raw ingredients after the first portion of solvent has been allowed to flow into the container.

The grinding of the raw ingredients at the first temperature after the first portion of solvent has been allowed to flow into the container makes the lipoxygenase of the raw ingredients inactive to a more sufficient degree and thus removes the beany smell more effectively.

In another aspect, an embodiment of the disclosure provides a device for producing a beverage. The device comprises a container configured to receive raw ingredients; an inlet configured to allow solvent to enter into the container; an indicator configured to indicate information about introducing solvent into the container through the inlet; a grinding mechanism configured to grind the raw ingredients in the container to generate the beverage; and a first heating unit configured to heat the beverage.

In still another aspect, an embodiment of the disclosure provides a device for producing a beverage. The device comprises a container configured to receive solvent; a raw-material provider arranged on the container and configured to provide raw materials to the solvent in the container; a valve arranged on the raw-material provider and configured to be controlled to open or close to allow the raw materials from the raw-material provider to enter the container or to prevent the raw materials from entering the container; a grinding mechanism configured to grind the raw ingredients in the container in order to generate the beverage; and a first heating unit configured to heat the beverage.

Using said device, there is no need for introducing the raw materials into the container manually before the device is started up. Instead, before the device is started up, the raw materials are first put into the raw-material provider, not into the container, and when the device starts to operate, the raw materials in the raw-material provider are then controlled to enter the container by controlling the valve to be open or closed, which makes the raw-material adding process more flexible and thereby significantly improves ease of use (?).

In still another aspect, an embodiment of the disclosure provides a device for producing a beverage. The device comprises a container configured to receive raw ingredients; a pump configured to be controlled to pump solvent from a tank into the container; a grinding mechanism configured to grind the raw ingredients in the container to generate the beverage; and a first heating unit configured to heat the beverage.

In a further aspect, an embodiment of the disclosure provides a method of producing a beverage. The method comprises the steps of introducing a first portion of solvent into a container stored with raw ingredients, the first portion of solvent having a first temperature; introducing a second portion of solvent into the container, the mixture of the first portion of solvent and the second portion of solvent having a second temperature, wherein the second temperature is lower than the first temperature; and grinding the raw ingredients together with the mixture of the first portion of solvent and the second portion of solvent to generate the beverage.

BRIEF DESCRIPTION OF THE DRAWINGS

The above and other objects and features of the present invention will become more apparent from the following detailed description considered in connection with the accompanying drawings, in which:

FIG. 2b is a cross-sectional view of the device for producing the beverage of FIG. 2a;

FIG. 3b is a cross-sectional view of the device for producing the beverage of FIG. 3a;

FIG. 4b is a cross-sectional view of the device for producing the beverage of FIG. 4a;

FIG. 5b is a cross-sectional view of the device for producing the beverage of FIG. 5a;

FIG. 6b is a cross-sectional view of the device for producing the beverage of FIG. 6a;

FIG. 7b is a cross-sectional view of the device for producing the beverage of FIG. 7a;

FIG. 8b is a cross-sectional view of the device for producing the beverage of FIG. 8a;

FIG. 9b is a cross-sectional view of the device for producing the beverage of FIG. 9a.

Throughout the above drawings, like reference numerals will be understood to refer to like, similar or corresponding features or functions.

DETAILED DESCRIPTION

Reference will now be made to embodiments of the disclosure, one or more examples of which are illustrated in the figures. The embodiments are provided by way of explanation of the disclosure, and are not meant as a limitation of the disclosure. For example, features illustrated or described as part of one embodiment may be used with another embodiment to yield a still further embodiment. It is intended that the disclosure encompasses these and other modifications and variations as come within the scope and spirit of the disclosure.

The device for producing a beverage according to one aspect of the disclosure comprises a container configured to receive raw ingredients; a solvent provider arranged on the container and configured to provide solvent to the raw ingredients in the container; a valve arranged on the solvent provider and configured to be controlled to open or close to allow the solvent from the solvent provider to flow into the container or to prevent the solvent from flowing into the container; a grinding mechanism configured to grind the raw ingredients in the container in order to generate the beverage; and a first heating unit configured to heat the beverage.

The raw ingredients may for example be soybeans, black soybeans, a mixture of soybeans and vegetables, a mixture of soybeans and fruits, a mixture of soybeans and grains, or any combination of those ingredients. The solvent may for example be water, mineral water, tap water, alkaline water, salted water, alcohol, or any combination of those solvents.

Hereinafter, for illustrative purposes only, the configuration/implementation of the device for producing a beverage according to one aspect of the disclosure will be described using soybeans as an illustrative example of the raw ingredients and using water as an illustrative example of the solvent. It will be appreciated that a person of ordinary skill in the art can fully understand the configuration/implementation of the device in relation to other raw ingredients and solvents.

FIGS. 2-5 show exemplary embodiments of a device 10 for producing a beverage according to one aspect of the disclosure. In these embodiments, the raw ingredients are soybeans, the solvent is water, and the resulting beverage is soy milk.

Figure 1:
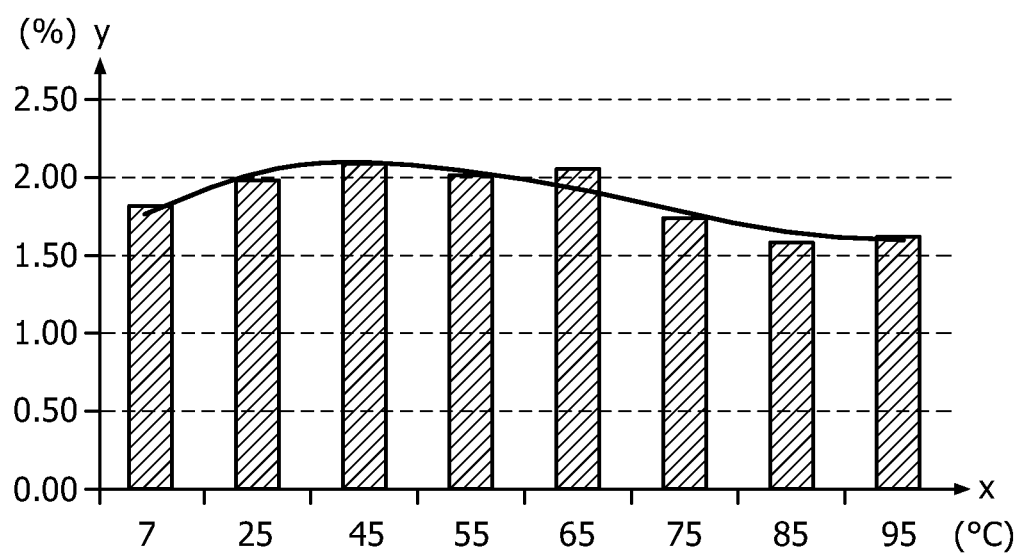
FIG. 1 shows the correlation between grinding temperature and soluble protein concentration.
Figure 2A:
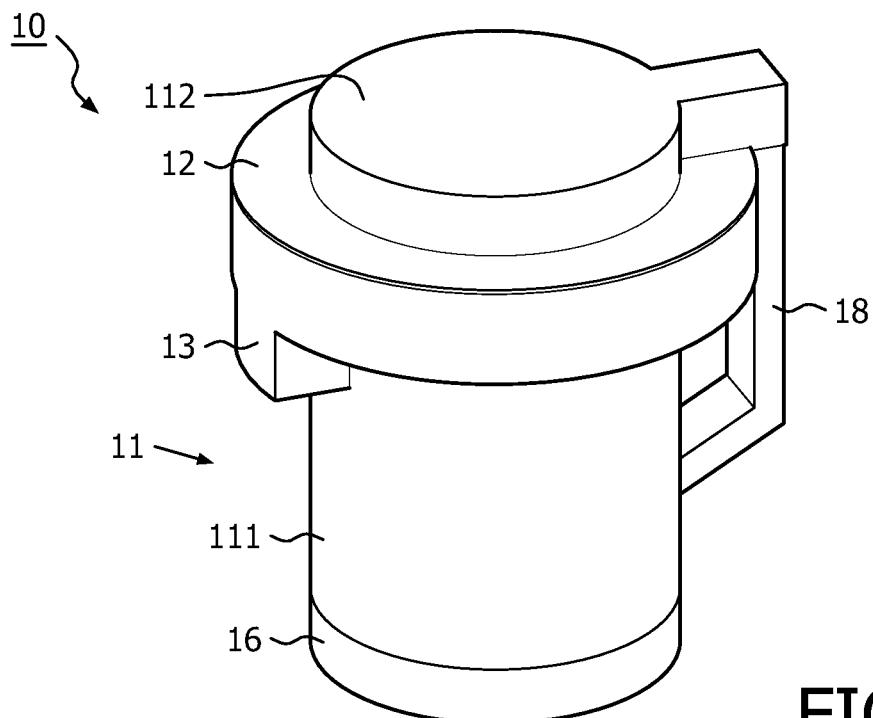
FIG. 2a is a top perspective view of an exemplary embodiment of a device for producing a beverage according to one aspect of the disclosure.
Figure 2B:
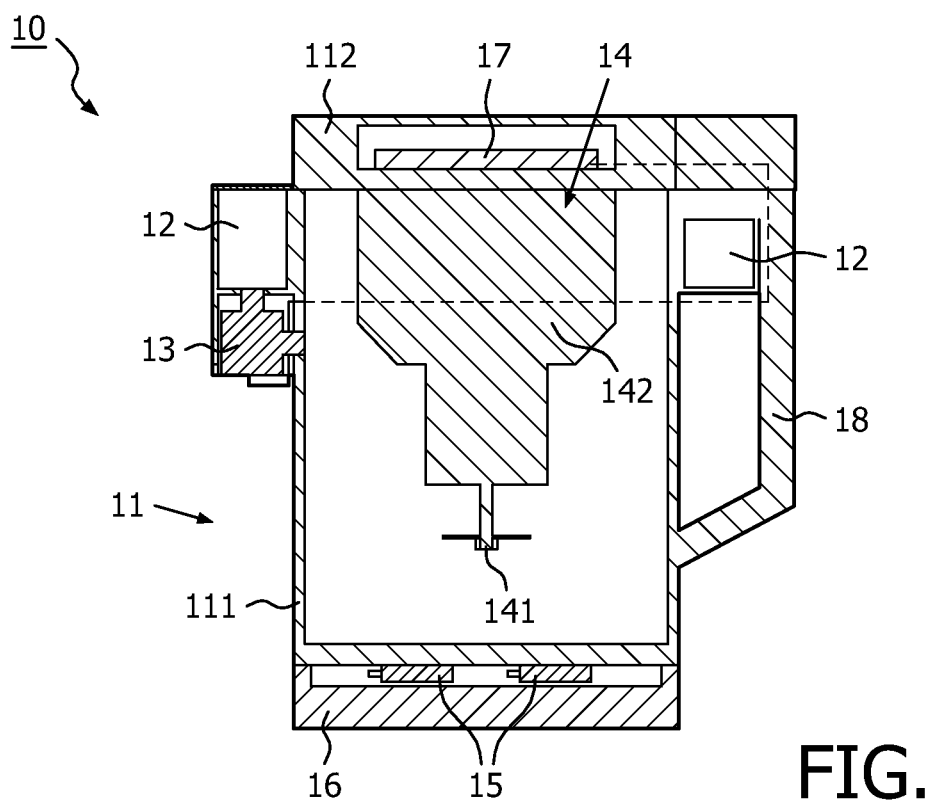

Referring to FIGS. 2a-2b, the device 10 comprises a container 11 configured to receive the soybeans, which may be made of plastic or stainless steel for example. The container 11 may include a cup 111, and a cover 112 that is intended to be provided on the cup 111 to cover the opening of the cup 111. The cup 111 may have any shape that is suitable to accommodate the soybeans, the water and the resulting soy milk, and a cylindrical cup is most desirable.

The device 10 further comprises a solvent provider 12 arranged on the container 11 and configured to supply the water to the soybeans in the container 11, which will be described in greater detail later in this document.

The device 10 further comprises a valve 13 arranged on the solvent provider 12 and configured to be controlled to open or close in order to allow the water from the solvent provider 12 to flow into the container 11 or to prevent the water from flowing into the container 11. Any kind of known valve may be used, such as an electromagnetic valve, or a motor valve, or a manual valve for example.

The device 10 further comprises a grinding mechanism 14 configured to grind the soybeans in the container 11 in order to produce the soy milk. The grinding mechanism 14 may take on any configuration, but generally includes a rotary cutter 141 and a motor 142 that is configured to drive the rotary cutter 141. To achieve a watertight condition, the motor 142 may be arranged within the cover 112, with its output shaft projecting from the cover 112. The rotary cutter 141 is attached to the end of the output shaft of the motor 142. When the cover 112 is provided on the cup 111, the rotary cutter 141 extends downward toward the bottom of the cup 111, such that grinding of the soybeans can be readily performed.

The device 10 further comprises a first heating unit 15 configured to heat the soy milk in the container 11. The first heating unit 15 may be arranged in container 11, for example. Alternatively, the device 10 may further comprise a base 16 on which the container 11 is seated, and accordingly the first heating unit 15 is arranged within the base 16. Any kind of heating unit may be used, such as a heating tube or heating rod for example.

Referring to FIGS. 2-4, for example, the solvent provider 12 may be a tank for storing water, which may be formed from plastic or stainless steel for example.

In one embodiment, the tank 12 may be arranged so as to at least partially surround the outer surface of the cup 111, as shown in FIGS. 2a-2b, and accordingly the valve 13 may be arranged at the bottom of the tank 12 or at the junction of the tank 12 and the cup 111 adjacent to the bottom of the tank 12. Alternatively, the tank 12 may also be arranged so as to at least partially surround the inner surface of the cup 111, and accordingly the valve 13 may be arranged at the bottom of the tank 12.

The tank 12 may be integrally formed with the cup 111, or may be an individual unit that can be detachably mounted on the cup 111 by means of a guide rail for example, for the purpose of easy cleaning and replacement. To enable the water stored in the tank 12 to flow into the cup 111, advantageously, the bottom of the tank 12 may be arranged in a higher position than the permissible maximum water level of the cup 111.

Figure 3A:
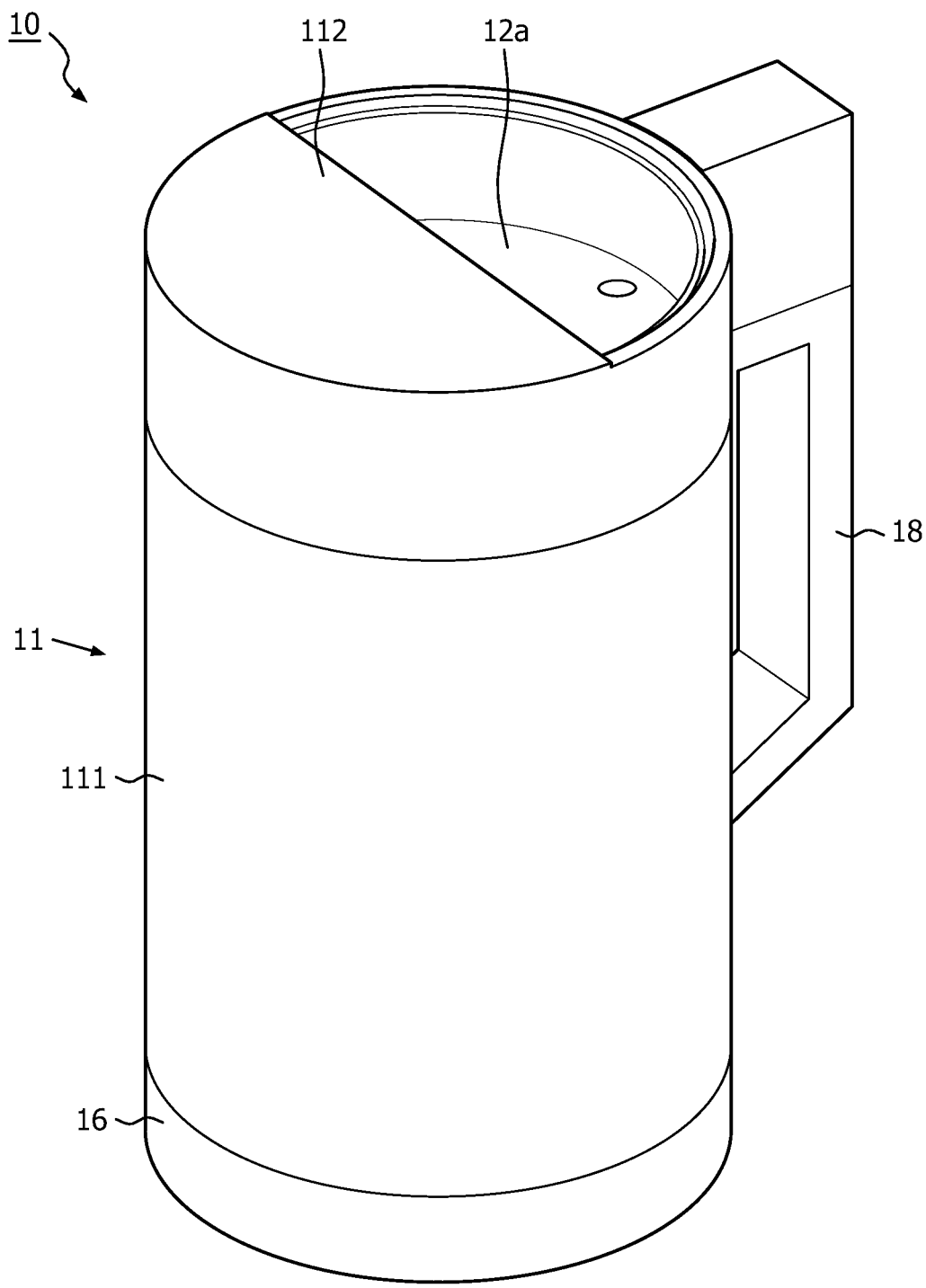
FIG. 3a is a top perspective view of another exemplary embodiment of a device for producing a beverage according to one aspect of the disclosure.
Figure 3B:
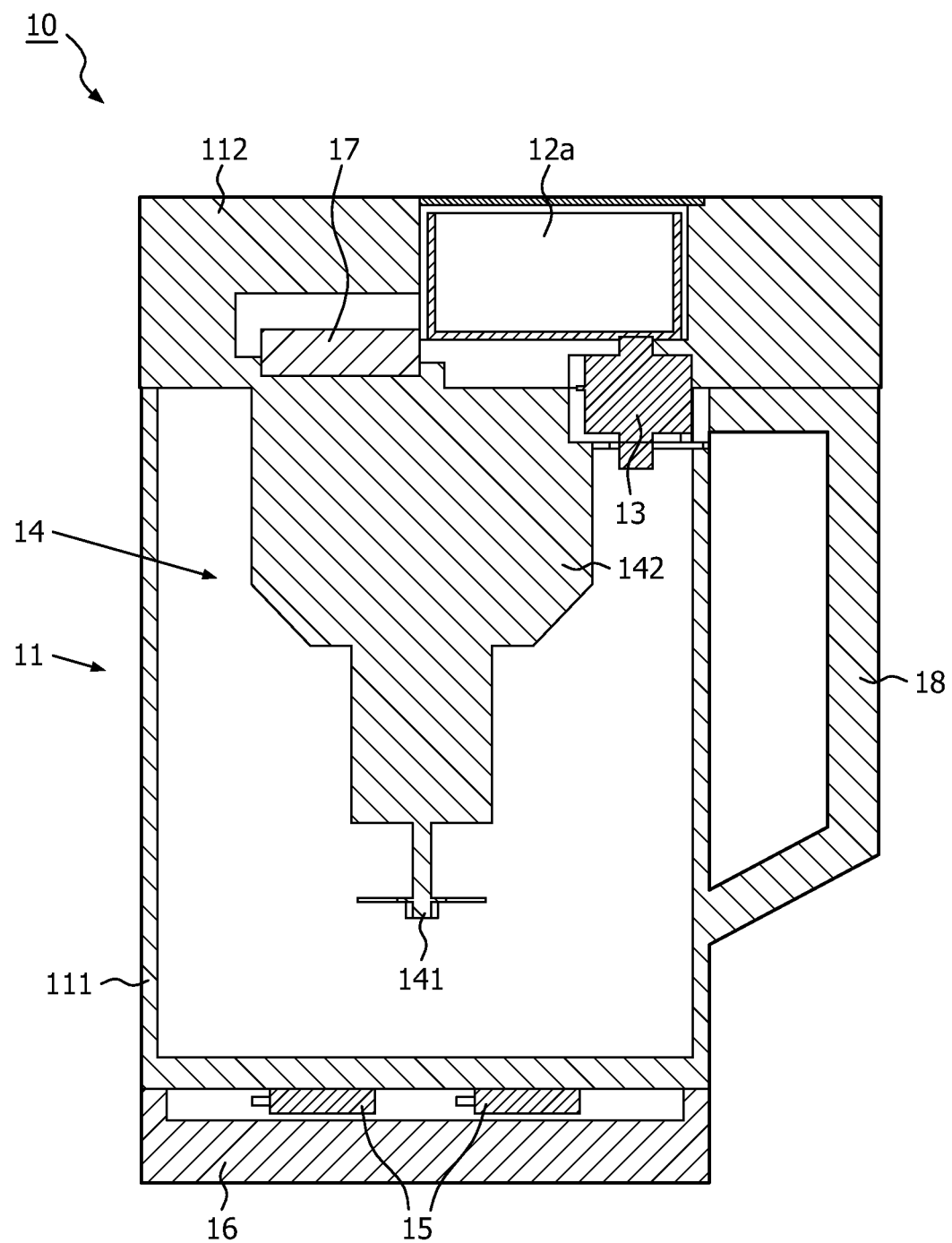

In another embodiment, the tank 12a may be arranged within the cover 112, as shown in FIGS. 3a-3b, and accordingly the valve 13 may be arranged at the bottom of the tank 12a.

The tank 12a may be integrally formed with the cover 112, for example. Alternatively, the tank 12a may be an individual unit that can be detachably mounted into the cover 112, for the benefit of easy cleaning and replacement. In this case, the cover 112 may be formed with an opening for receiving the tank 12a, and accordingly the outer surface of the tank 12a may be formed with at least one protrusion such that the tank 12a is prevented from dropping into the cup 111 when the tank 12a is received within the cover 112.

Figure 4A:
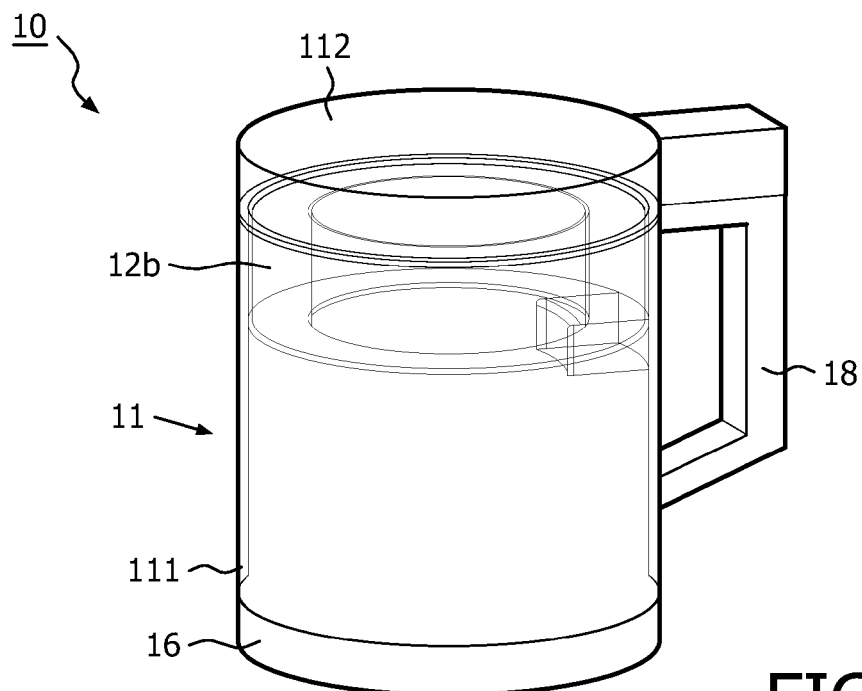
FIG. 4a is a top perspective view of still another exemplary embodiment of a device for producing a beverage according to one aspect of the disclosure.
Figure 4B:
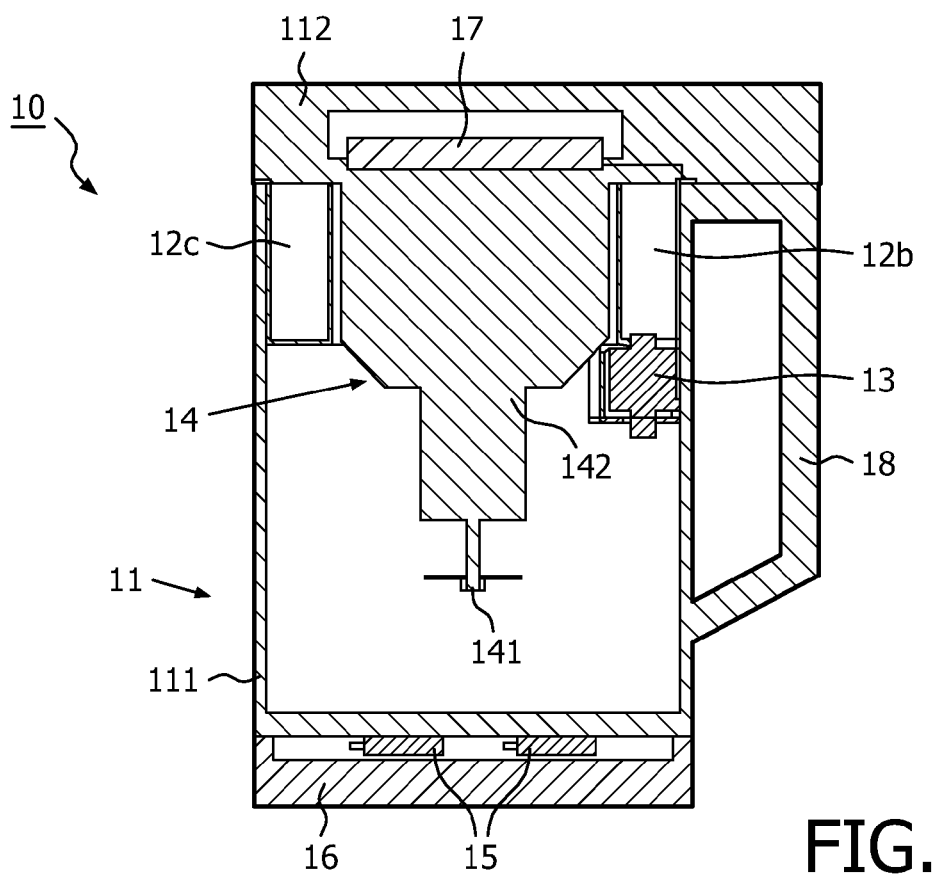

In still another embodiment, the tank 12b may be arranged under the cover 112, as shown in FIGS. 4a-4b, and accordingly the valve 13 may be arranged at the bottom of the tank 12b or at the sidewall of the tank 12b adjacent to the bottom thereof.

The tank 12b may be integrally formed with the cover 112, or may be an individual unit that can be detachably mounted under the cover 112 by means of a guide rail for example, for the purpose of easy cleaning and replacement. To enable the water stored in the tank 12b to flow into the cup 111, advantageously, the bottom of the tank 12b may be arranged in a higher position than the permissible maximum water level of the cup 111.

It is to be noted that the above-mentioned three arrangements of the tank are only illustrative examples, and any other suitable arrangement of the tank is also applicable.

Figure 5A:
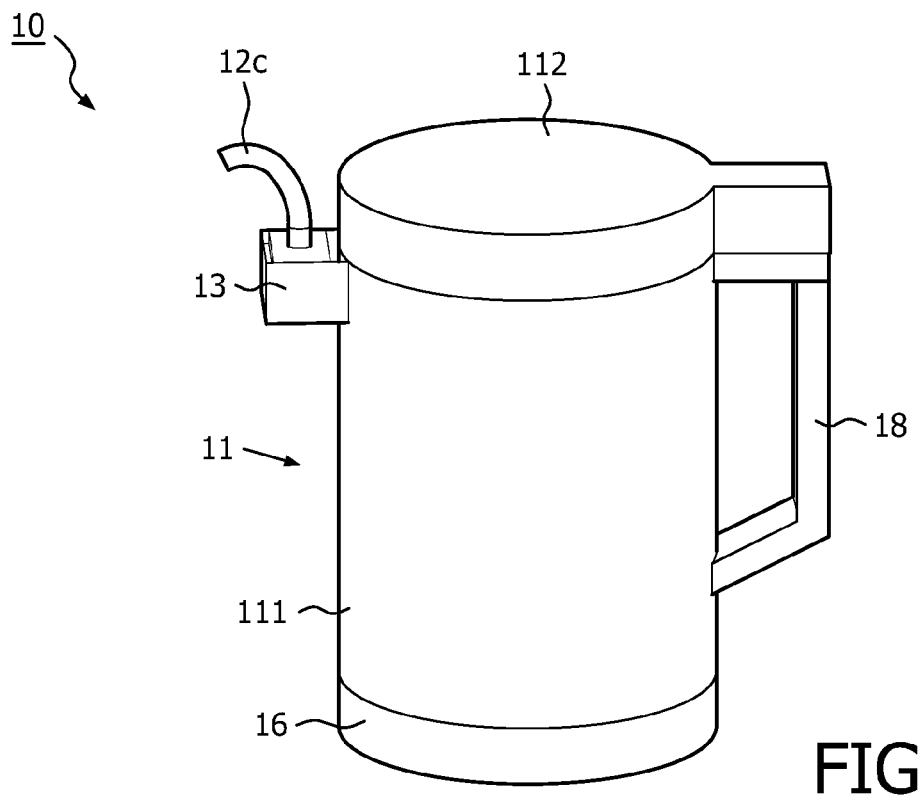
FIG. 5a is a top perspective view of a further exemplary embodiment of a device for producing a beverage according to one aspect of the disclosure.
Figure 5B:
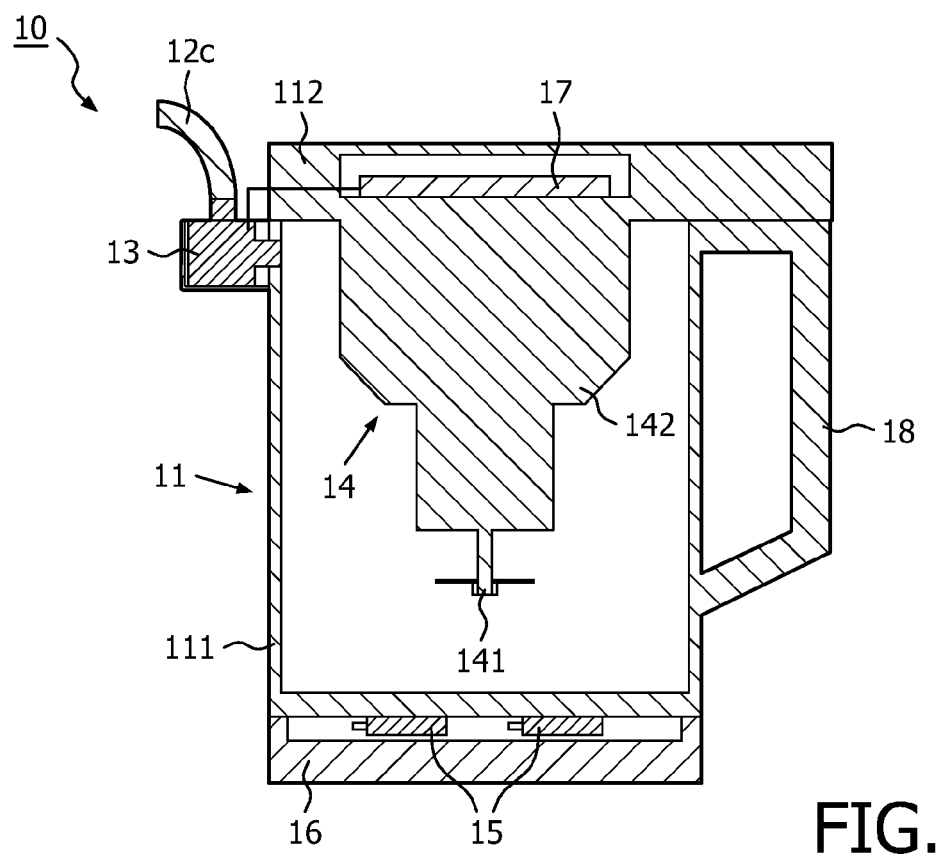

Referring to FIGS. 5a-5b, the solvent provider 12 may also be an inlet. The inlet 12c has one end connected to the cup 111 and the other end connected to a water source to allow water from the water source to enter the cup 111. The valve 13 is arranged at the junction of the inlet 12c and the cup 111. When the valve 13 is controlled to be open, the water from the water source flows into the cup 111 through the inlet 12c.

It is to be noted that the inlet 12c may also be arranged on the cover 112.

It is to be noted that the tank and the inlet are only two illustrative examples of the solvent provider, and that any other mechanism that is suitable to provide the water to the soybeans in the container 11 is also applicable in this disclosure.

Advantageously, the device 10 may further comprise a controller 17. The controller 17 is configured to control the valve 13 to open or close to allow the water from the solvent provider 12 to flow into the container 11 or to prevent the water from flowing into the container 11. Furthermore, the controller 17 is further configured to control the operation of the grinding mechanism 14 and the first heating unit 15.

Advantageously, the device 10 may further comprise a hand grip 18, for ease of use.

Hereinafter, the operation of the device 10 is described in detail in conjunction with FIGS. 2a-2b.

First, the soybeans or soaked soybeans are put into the cup 111, and the water is poured into the tank 12. It is assumed that the water poured into the tank 12 is at room temperature.

After the above preparations, the device 10 is started up. When the device 10 starts to operate, the controller 17 controls the valve 13 to be open to allow the water from the tank 12 to flow into the cup 111. The amount of water that flows into the cup 111 may be controlled by the controller 17. For example, when the valve 13 is controlled to be open, the controller 17 starts timing, and controls the valve 13 to be closed when the preset time is reached. Alternatively, the device 10 may further comprise a flow meter (not shown) configured to measure the amount of water that flows into the cup 111. When the valve 13 is controlled to be open, the flow meter starts to measure the amount of water flowing into the cup 111 and reports the measurement results to the controller 17. The controller 17 controls the valve 13 to be closed when the amount of water that flows into the cup 111 meets a preset amount. It is to be noted that the preset time and preset amount are prestored in the controller 17, which may vary according to use.

After the water has flown into the cup 111, the first heating unit 15 begins to heat the water and the soybeans together in the cup 111 to a predetermined temperature, for example 80° C.~100° C. When the water and the soybeans are heated together to the predetermined temperature, the grinding mechanism 14 starts to grind the soybeans in the cup 111 at the predetermined temperature to produce the soy milk, and then the first heating unit 15 continues to heat the soy milk until it boils.

Finally, the boiled soy milk is filtered and ready for consumption.

Using the device 10, there is no need for introducing the water into the cup 111 manually before the device 10 is started up. Instead, before the device 10 is started up, the water is first poured into the tank 12, not into the cup 111, and when the device 10 starts to operate, the water in the tank 12 is controlled to flow into the cup 111 by controlling the valve 13 to be open or to be closed, which makes the water-adding process more flexible, thereby significantly improving ease of use.

In another embodiment, the soybeans can be soaked by means of the device 10. To be specific, when the device 10 starts to operate, the controller 17 controls the valve 13 to open in order to allow the water from the tank 12 to flow into the cup 111. After the water has flown into the cup 111, the controller 17 starts timing and controls the first heating unit 15 to heat the water and the soybeans together in the cup 111 when the preset time, for example two hours, has passed. After the water and the soybeans have been heated together to the predetermined temperature, the grinding mechanism 14 starts grinding the soybeans in the cup 111 at the predetermined temperature to produce soy milk. In this embodiment, as the first heating unit 15 starts to heat the water and the soybeans together in the cup 111 after the preset time has passed, the soybeans have been soaked in the water for the preset time, as a result of which the soybeans are soaked.

In still another embodiment, to further increase the solubility of soy protein in the resulting soy milk, the water-adding process is divided into two steps.

To be specific, when the device 10 starts to operate, the controller 17 controls the valve 16 to open to allow a first portion of water from the tank 12 to flow into the cup 111, and then controls the valve 13 to be closed. The amount of the first portion of water that flows into the cup 111 may be controlled by the controller 17. For example, when the valve 13 is controlled to be open, the controller 17 starts timing, and controls the valve 13 to be closed when the preset time has passed. Alternatively, the device 10 may further comprise a flow meter (not shown) configured to measure the amount of water that flows into the cup 111. When the valve 13 is controlled to be open, the flow meter starts to measure the amount of water flowing into the cup 111 and reports the measurement results to the controller 17. The controller 17 controls the valve 13 to be closed when the amount of water that flows into the cup 111 meets a preset amount. It is to be noted that the preset time and preset amount are prestored in the controller 17, which may vary according to use.

When the first portion of water flows into the cup 111, the first heating unit 15 begins to heat the first portion of water to a first temperature. Alternatively, the first portion of water is heated to the first temperature before it enters the cup 111. In this regard, the device 10 may further comprise a second heating unit (not shown) configured to heat the first portion of water to the first temperature before the first portion of water from the tank 12 enters the cup 111. For example, the second heating unit may be arranged between the tank 12 and the cup 111. When the valve 13 is controlled to be open, the second heating unit heats the first portion of water from the tank 12 to the first temperature and then allows the heated first portion of water to flow into the cup 111. Advantageously, the first temperature may be in the range of [80° C., 100° C.].

As the first portion of water in the cup 111 is heated to the first temperature, the lipoxygenase of the soybeans in the cup 111 becomes almost inactive, as a result of which the beany smell is removed effectively. To make the lipoxygenase inactive to a more sufficient degree, advantageously, after the first portion of water in the cup 111 has been heated to the first temperature, the grinding mechanism 14 grinds the soybeans in the cup 111 at the first temperature for a first grinding duration. Advantageously, the first grinding duration is set to be much shorter than the required full duration of the grinding process.

After the first grinding process of the grinding mechanism 14 has been completed, the controller 17 controls the valve 13 to open again in order to allow a second portion of water from the tank 12 to flow into the cup 111 to be mixed with the first portion of water, and then the controller controls the valve 13 to be closed. The amount of the second portion of water that flows into the cup 111 may be controlled by the controller 17 in a manner which is similar to the control of the amount of the first portion of water, and therefore will not be described here for simplicity. As the water in the tank 12 is at room temperature, the mixture of the first portion of water and the second portion of water in the cup 111 has a second temperature that is lower than the first temperature. Advantageously, the second temperature may be in the range of [40° C., 70° C.]. The amount of the second portion of water may be determined based on the amount of the first portion of water, the first temperature and the required second temperature.

When the second portion of water flows into the cup 111, the grinding mechanism 14 continues to grind the soybeans in the cup 111 at the second temperature for a second grinding duration to generate the soy milk. Advantageously, the second grinding duration is set to be longer than the first grinding duration.

As the solubility of soy protein at the second temperature is higher than at the first temperature, more protein is dissolved in the resulting soy milk when the grinding mechanism 14 grinds the soybeans in the cup 111 at the second temperature.

After the second grinding process of the grinding mechanism 14 has been completed, the first heating unit 15 starts to heat the soy milk to a third temperature, for example 100° C., i.e. the heating unit 15 heats the soy milk until it boils.

Therefore, the device 10 of this embodiment enables higher soy protein extraction while maintaining a good smell of the soy milk.

Those skilled in the art will appreciate that, as a variation of the above embodiment, the first portion of water can be introduced into the cup 111 manually before the device 10 is started up.

In a further embodiment, the timer function may be performed by means of the device 10. In this regard, the device 10 may further comprise a user interface (not shown) enabling the user to preset the time when he wants the device 10 to become operative. For example, if the user wants the device 10 to start operating eight hours later, then he/she must input the preset time 'eight' through the user interface. The user interface will send a signal indicating the preset time to the controller 17 in response to the user's input. After receiving the signal from the user interface, the controller 17 starts timing and then controls the valve 13 to open in order to allow water from the tank 12 to flow into the cup 111 when the preset time is reached. After the water has flown into the cup 111, the heating and grinding process is performed to produce the soy milk. It is to be noted that, in this embodiment, after the preset time has been reached, the water-adding process may also be divided into two steps, which will not be described here for the sake of simplicity.

Figure 6A:
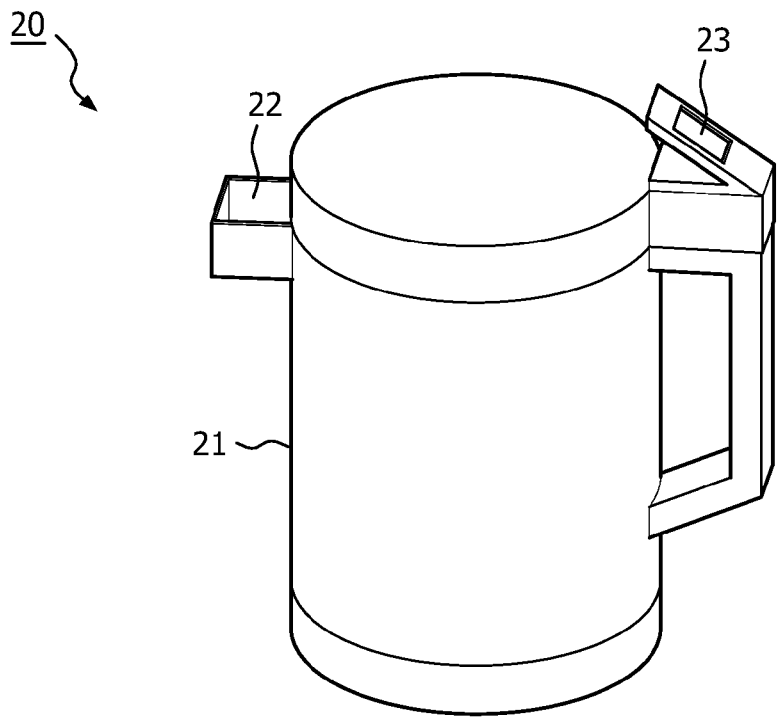
FIG. 6a is a top perspective view of an exemplary embodiment of a device for producing a beverage according to another aspect of the disclosure.
Figure 6B:
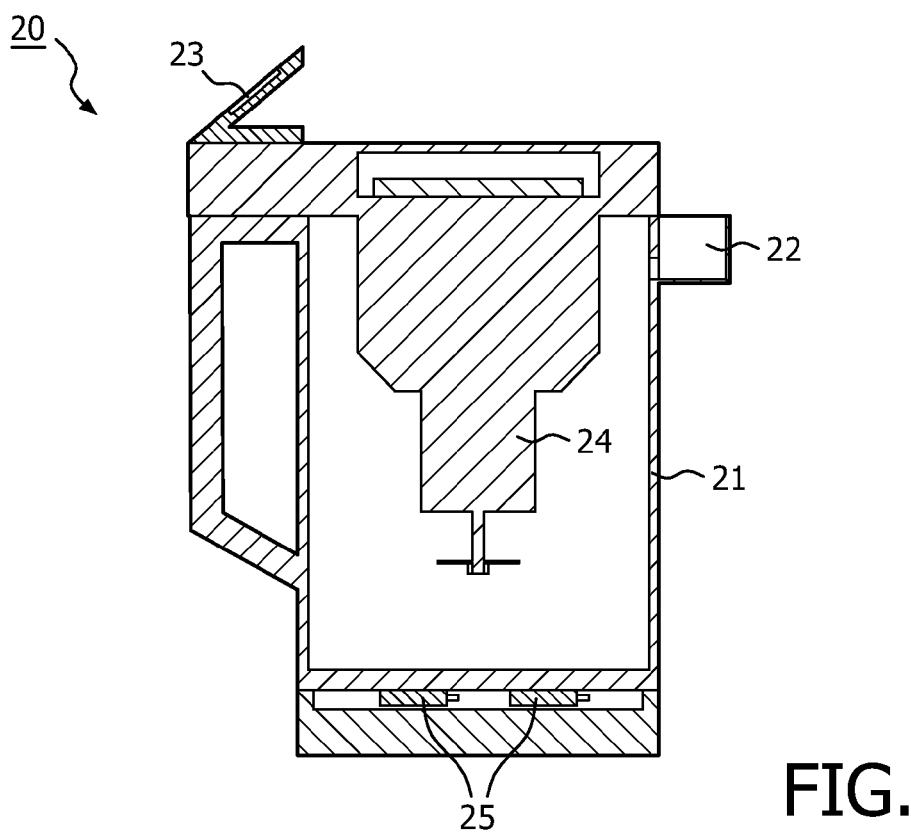

According to another aspect of the disclosure, there is provided a device 20 for producing a beverage. FIGS. 6a-6b show an exemplary embodiment of a device 20 for producing beverage. In this embodiment, the raw ingredients are soybeans, the solvent is water, and the resulting beverage is soy milk.

Referring to FIGS. 6a-6b, the device 20 comprises a container 21 configured to receive soybeans. The configuration of the container 21 may be the same as that of the container 11, which will not be described here for the sake of simplicity.

The device 20 further comprises an inlet 22 arranged on the container 21 and configured to supply water to the container 21.

The device 20 further comprises an indicator 23 arranged on the container 21 and configured to indicate information about introducing water into the container 21 through the inlet 22. Any type of known indicator may be used such as a screen or a speaker for example.

The device 20 further comprises a grinding mechanism 24 configured to grind the soybeans in the container 21 to produce soy milk. The configuration of the grinding mechanism 24 may be the same as that of grinding mechanism 14, which will not be described here for the sake of simplicity.

The device 20 further comprises a first heating unit 25 configured to heat the soy milk in the container 21. The configuration of the first heating unit 25 may be the same as that of the first heating unit 15, which will not be described here for the sake of simplicity.

Hereinafter, the operation of the device 20 is described in detail in conjunction with FIGS. 6a-6b.

First, soybeans or soaked soybeans are introduced into the container 21.

Then, the device 20 is started up. When the device 20 starts operating, the indicator 23 indicates information about introducing water into the container 21. Following up the information, the user has to introduce water into the container 21 through the inlet 22. After the water has been introduced into the container 21, the first heating unit 25 begins to heat the water and the soybeans together in the container 21 to a predetermined temperature, for example 80° C.~100° C. When the water with the soybeans are heated together to the predetermined temperature, the grinding mechanism 24 starts grinding the soybeans in the container 21 at the predetermined temperature to produce the soy milk, and then the first heating unit 25 continues to heat the soy milk until it boils.

Finally, the boiled soy milk is filtered and ready for consumption.

In another embodiment, the water-adding process may be divided into two steps. To be specific, when the device 20 starts to operate, the indicator 23 indicates information about introducing a first portion of water into the container 21. Following up the information, the user introduces the first portion of water into the container 21 through the inlet 22. When the first portion of water is introduced into the container 21, the first heating unit 25 begins to heat the first portion of water and the soybeans together to a first temperature. Advantageously, after the first portion of water and the soybeans have been heated together to the first temperature, the grinding mechanism 24 may grind the soybeans in container 21 at the first temperature for a first grinding duration.

When the first grinding process of the grinding mechanism 24 is finished, the indicator 23 indicates information about introducing a second portion of water into the container 21. Following up the information, the user introduces the second portion of water into the container 21 through the inlet 22. When the second portion of water is introduced into the container 21, the grinding mechanism 24 continues to grind the soybeans in container 21 at the second temperature for a second grinding duration to generate the soy milk.

After the second grinding process of the grinding mechanism 22 has been completed, the first heating unit 25 starts to heat the soy milk to a third temperature, for example 100° C., i.e. the heating unit 13 heats the soy milk until it boils.

The first temperature may be in the range of [80° C., 100° C.] and the second temperature may be in the range of [40° C., 70° C.].

Figure 7A:
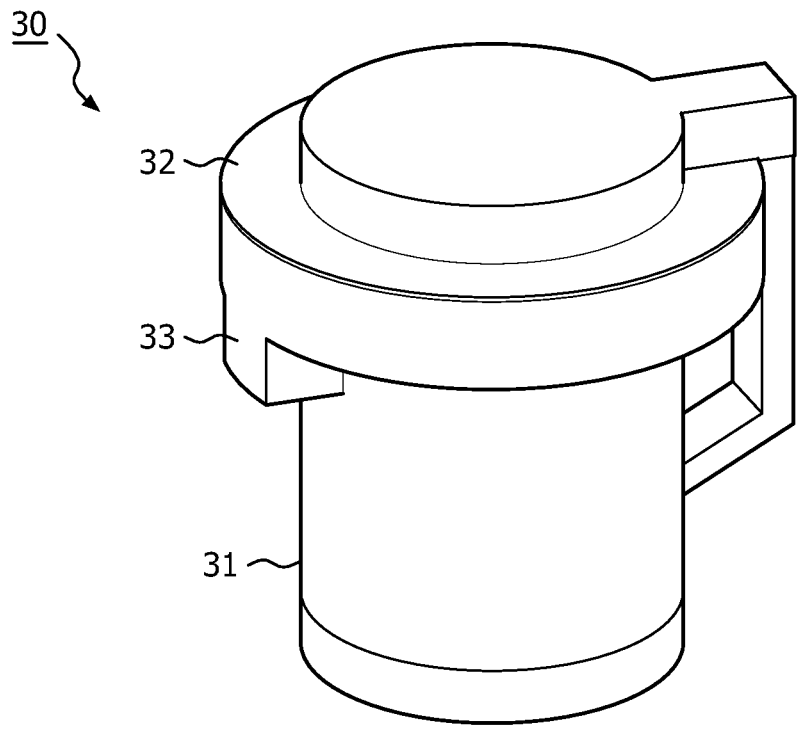
FIG. 7a is a top perspective view of an exemplary embodiment of a device for producing a beverage according to still another aspect of the disclosure.
Figure 7B:
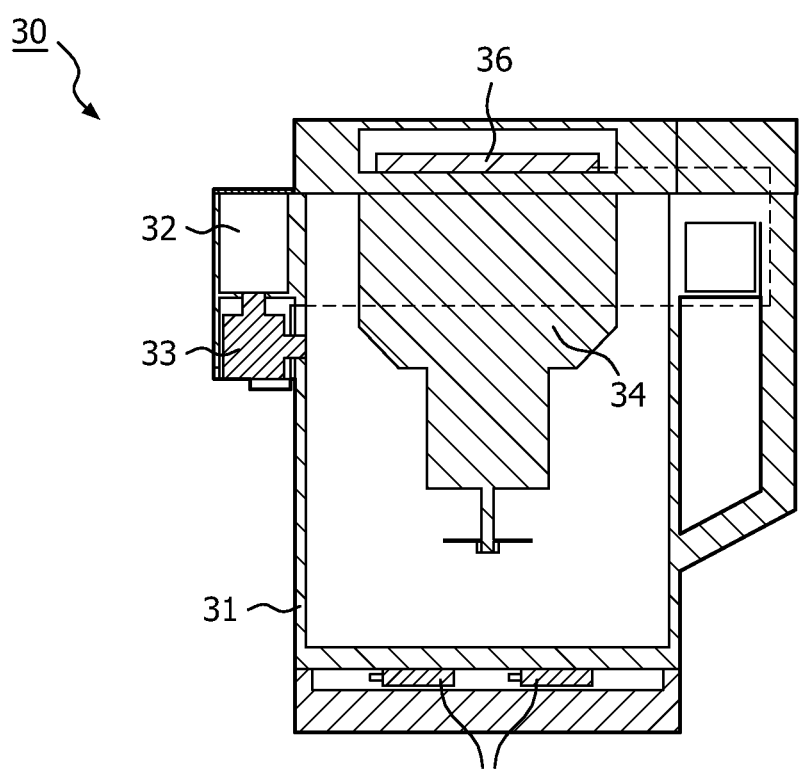

According to still another aspect of the disclosure, there is provided a device 30 for producing a beverage. FIGS. 7a-7b show an exemplary embodiment of a device 30 for producing a beverage. In this embodiment, the raw ingredients are soybeans, the solvent is water, and the resulting beverage is soy milk.

Referring to FIGS. 7a-7b, the device 30 comprises a container 31 configured to receive the water. The configuration of the container 31 may be the same as that of the container 11, which will not be described here for the sake of simplicity.

The device 30 further comprises a raw-material provider 32 arranged on the container 31 and configured to add the soybeans to the water in the container 31. The raw-material provider 32 may be a tank for storing the soybeans. The arrangement of the tank 32 may be the same as that of the tank 12, which will be not described here for the sake of simplicity.

The device 30 further comprises a valve 33 arranged on the raw-material provider 32 and configured to be controlled to open or close in order to allow the soybeans from the raw-material provider 32 to enter the container 31 or to prevent the soybeans from entering the container 31. Any kind of known valve may be used, such as an electromagnetic valve, or a motor valve, or a manual valve for example.

The device 30 further comprises a grinding mechanism 34 configured to grind the soybeans in the container 31 to produce the soy milk. The configuration of the grinding mechanism 34 may be the same as that of the grinding mechanism 14, which will not be described here for the sake of simplicity.

The device 30 further comprises a first heating unit 35 configured to heat the soy milk in the container 31. The configuration of the first heating unit 35 may be the same as that of the first heating unit 15, which will not be described here for the sake of simplicity.

Advantageously, the device 30 may further comprise a controller 36. The controller 36 is configured to control the valve 33 to open or close in order to allow the soybeans from the raw-material provider 32 to enter the container 31 or to prevent the soybeans from entering the container 31. Furthermore, the controller 36 is further configured to control the operation of the grinding mechanism 34 and the first heating unit 35.

Hereinafter, the operation of the device 30 is described in detail in conjunction with FIGS. 7a-7b.

First, the water is poured into the container 31, and the soybeans or soaked soybeans are introduced into the raw-material provider 32.

After the above preparation has been completed, the device 30 is started up. When the device 30 starts to operate, the controller 36 controls the valve 33 to open in order to allow the soybeans from the raw-material provider 32 to enter the container 31. The amount of soybeans that enter the container 31 may be controlled by the controller 36. After the soybeans have entered the container 31, the first heating unit 35 begins to heat the water and the soybeans together in the container 31 to a predetermined temperature, for example 80° C.~100° C. When the water with the soybeans are heated together to the predetermined temperature, the grinding mechanism 34 starts to grind the soybeans in container 31 at the predetermined temperature to produce the soy milk, and then the first heating unit 35 continues to heat the soy milk until it boils.

Finally, the boiled soy milk is filtered and ready for consumption.

Using the device 30, there is no need for introducing the soybeans into the container 31 manually before the device 30 is started up. Instead, before the device 30 is started up, the soybeans are put into the raw-material provider 32, but not into the container 31, and when the device 30 starts to operate, the soybeans in the raw-material provider 32 are controlled to enter the container 31 by controlling the valve 33 to be open or closed, which makes the soybean-adding process more flexible and thereby significantly improves ease of use.

Figure 8A:
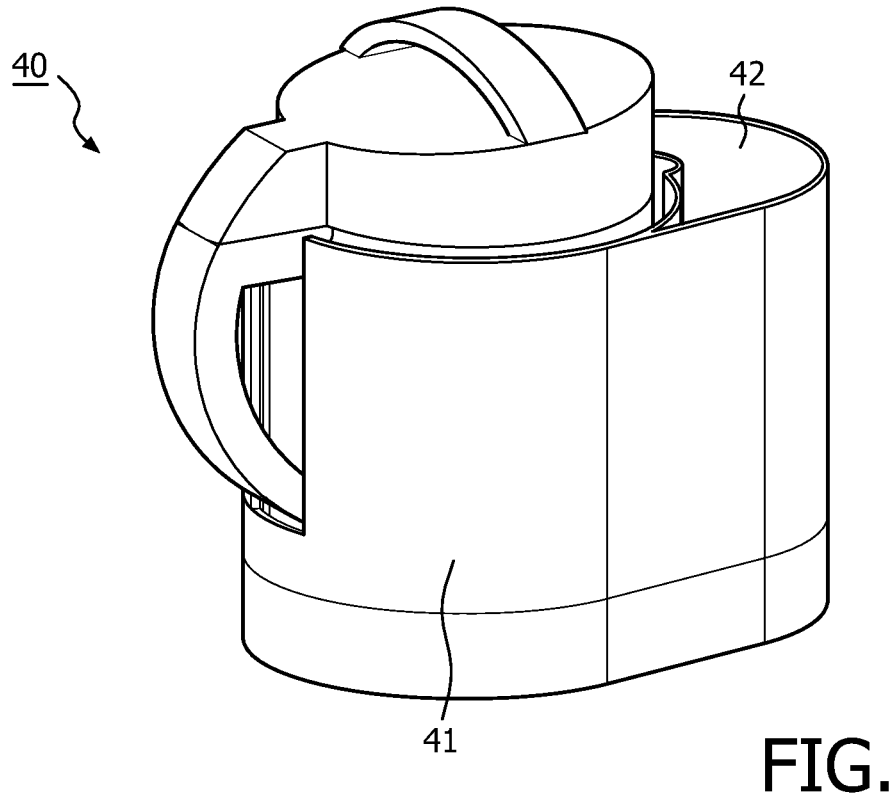
FIG. 8a is a top perspective view of an exemplary embodiment of a device for producing a beverage according to still another aspect of the disclosure.
Figure 8B:
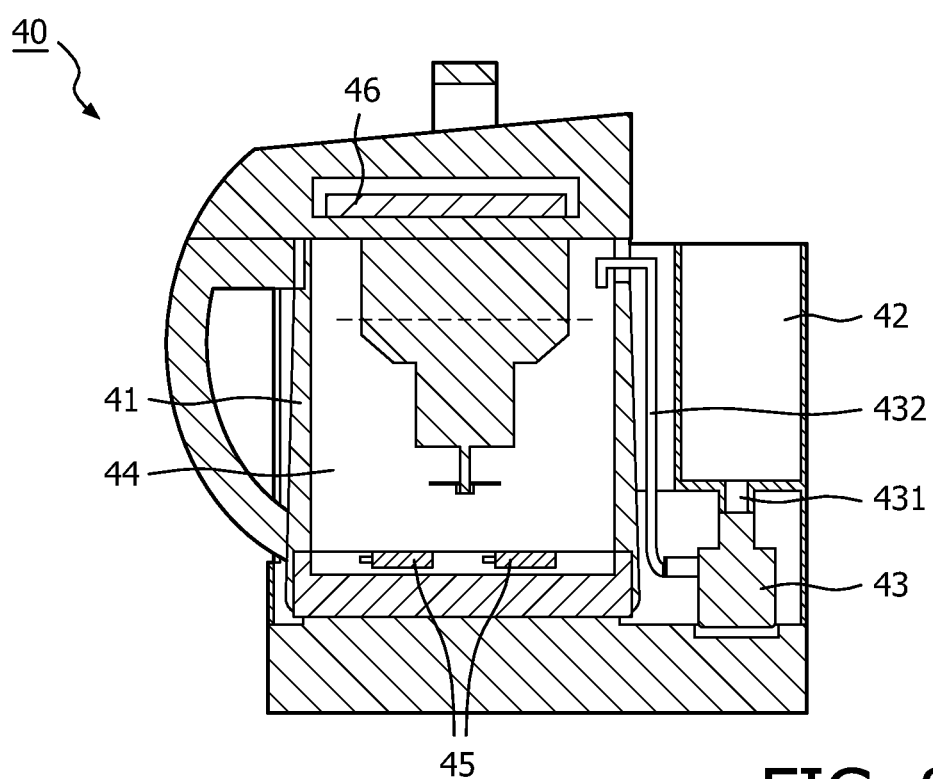

According to still another aspect of the disclosure, there is provided a device 40 for producing a beverage. FIGS. 8a-8b show an exemplary embodiment of a device 40 for producing a beverage. In this embodiment, the raw ingredients are soybeans, the solvent is water, and the resulting beverage is soy milk.

Referring to FIGS. 8a-8b, the device 40 comprises a container 41 configured to receive the soybeans or soaked soybeans. The configuration of the container 41 may be the same as that of the container 11, which will not be described here for the sake of simplicity.

The device 40 further comprises a tank 42 configured to store water. For example, the tank 42 may be arranged adjacent to the container 41, as shown in FIGS. 8a-8b.

The device 40 further comprises a pump 43 configured to be controlled to pump the water from tank 42 into the container 41. To be specific, referring to FIG. 8b, the inlet of the pump 43 is coupled to the tank 42 by a first pipe 431 and the outlet of the pump 43 is coupled to the container 41 by a second pipe 432. When the pump 43 is controlled to operate, it draws the water from the tank 42 through the first pipe 431 and then allows the water to flow into the container 41 through the second pipe 432.

The device 40 further comprises a grinding mechanism 44 configured to grind the soybeans in the container 41 to produce the soy milk. The configuration of the grinding mechanism 44 may be the same as that of the grinding mechanism 14, which will not be described here for the sake of simplicity.

The device 40 further comprises a first heating unit 45 configured to heat the soy milk in the container 41. The configuration of the first heating unit 45 may be the same as that of the first heating unit 15, which will not be described here for the sake of simplicity.

Advantageously, the device 40 may further comprise a controller 46. The controller 46 is configured to control the pump 43 to pump the water from tank 42 into the container 41. Furthermore, the controller 46 is further configured to control the operation of the grinding mechanism 44 and the first heating unit 45.

It will be appreciated that the tank 42 is an optional element for the device 40.

Hereinafter, the operation of the device 40 is described in detail in conjunction with FIGS. 8a-8b.

First, the soybeans or soaked soybeans are put into the container 41, and the water is poured into the tank 42.

After the above preparation has been completed, the device 40 is started up. When the device 40 starts to operate, the controller 46 controls the pump 43 to pump the water from the tank 42 into the container 41. The amount of water that is pumped into the container 41 may be controlled by the controller 46. For example, when the pump 43 is controlled to operate, the controller 46 starts timing, and then controls the pump 43 to stop operating when the preset time is reached. Alternatively, the device 40 may further comprise a flow meter (not shown) configured to measure the amount of water flowing into the container 41. When the pump 43 is controlled to operate, the flow meter starts to measure the amount of water flowing into the container 41 and reports the measurement results to the controller 46. The controller 46 controls the pump 43 to stop operating when the amount of water pumped into the container 41 meets a preset amount. It is to be noted that the preset time and preset amount are prestored in the controller 46, which may vary according to practical use.

After the water has been pumped into the container 41, the first heating unit 45 begins to heat the water and the soybeans together in the container 41 to a predetermined temperature, for example 80° C.~100° C. When the water and the soybeans together are heated to the predetermined temperature, the grinding mechanism 44 starts to grind the soybeans in the container 41 at the predetermined temperature to produce the soy milk, and then the first heating unit 45 continues to heat the soy milk until it boils.

Finally, the boiled soy milk is filtered and ready for consumption.

In another embodiment, the water-adding process may be divided into two steps. To be specific, when the device 40 starts to operate, the controller 46 controls the pump 43 to pump a first portion of water from the tank 42 into the container 41. The amount of the first portion of water that is pumped into the container 41 may be controlled by the controller 46. For example, when the pump 43 is controlled to operate, the controller 46 starts timing, and then controls the pump 43 to stop operating when the preset time is reached. Alternatively, the device 40 may further comprise a flow meter (not shown) configured to measure the amount of water flowing into the container 41. When the pump 43 is controlled to operate, the flow meter starts to measure the amount of water flowing into the container 41 and reports the measurement results to the controller 46. The controller 46 controls the pump 43 to stop operating when the amount of water that is pumped into the container 41 meets a preset amount. It is to be noted that the preset time and preset amount are prestored in the controller 46, which may vary according to practical use.

When the first portion of water is pumped into the container 41, the first heating unit 45 begins to heat the first portion of water and the soybeans together to a first temperature. Advantageously, after the first portion of water and the soybeans together have been heated to the first temperature, the grinding mechanism 44 may grind the soybeans in container 41 at the first temperature for a first grinding duration.

When the first grinding process of the grinding mechanism 44 has been completed, the controller 17 controls the pump 43 to pump a second portion of water from the tank 42 into the container 41. The amount of the second portion of water that is pumped into container 41 may be controlled by the controller 46, which is similar to the control of the amount of the first portion of water, and will not be described here for the sake of simplicity. When the second portion of water is pumped into the container 41, the grinding mechanism 44 continues to grind the soybeans in container 41 at the second temperature for a second grinding duration to generate the soy milk.

After the second grinding process of the grinding mechanism 42 has been finished, the first heating unit 45 starts to heat the soy milk to a third temperature, for example 100° C., i.e. the heating unit 43 heats the soy milk until it boils.

The first temperature may be in the range of [80° C., 100° C.] and the second temperature may be in the range of [40° C., 70° C.].

Figure 9A:
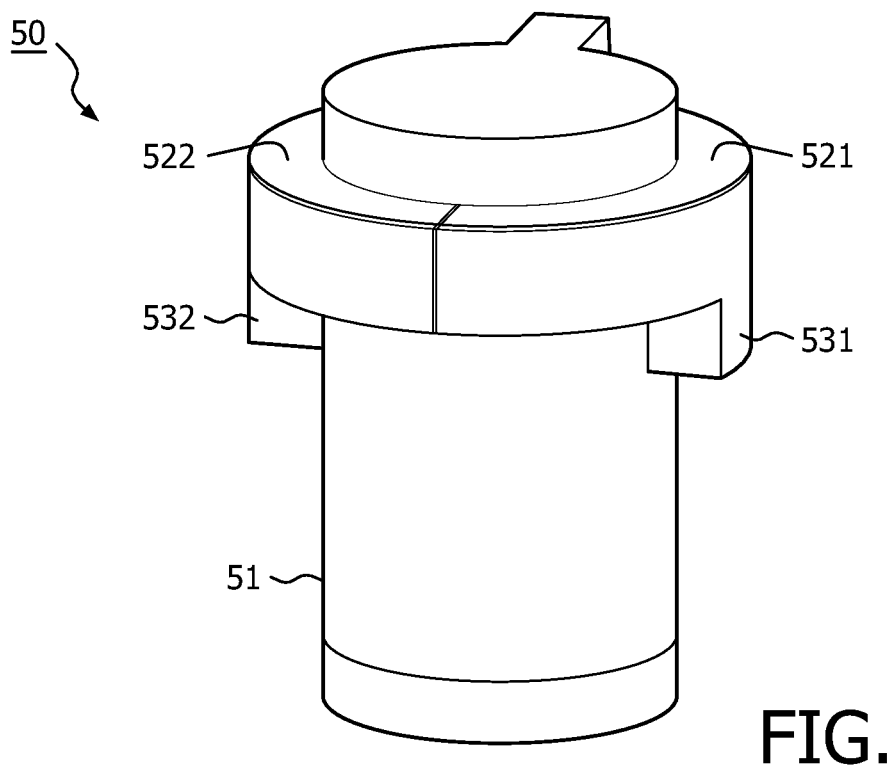
FIG. 9a is a top perspective view of an exemplary embodiment of a device for producing a beverage according to still another aspect of the disclosure.
Figure 9B:
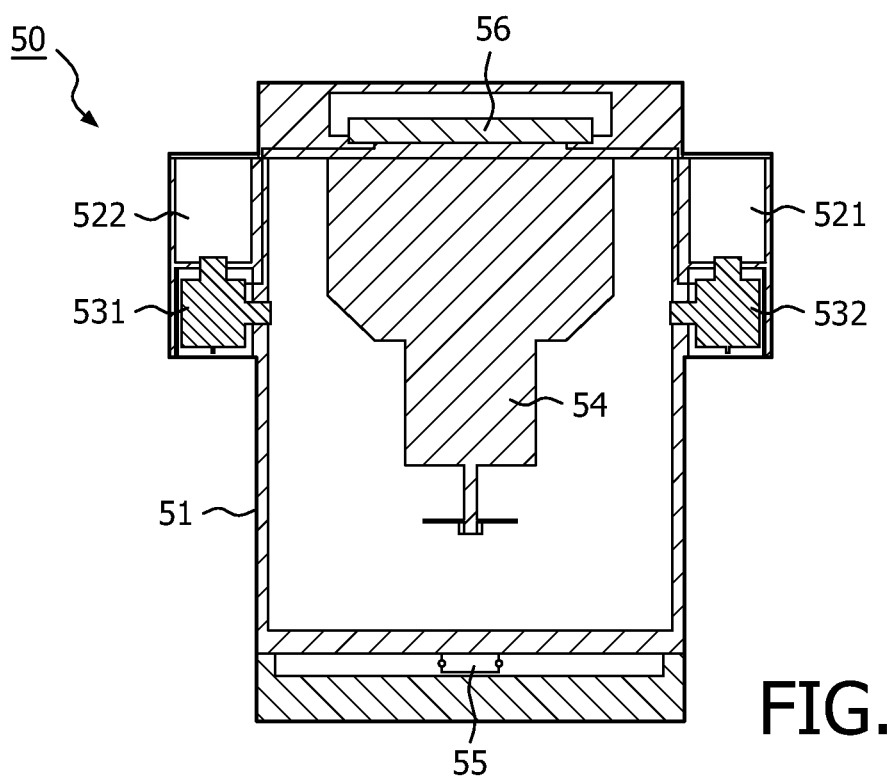

According to still another aspect of the disclosure, there is provided a device 50 for producing a beverage. FIGS. 9a-9b show an exemplary embodiment of a device 50 for producing a beverage. In this embodiment, the raw ingredients are soybeans, the solvent is water, and the resulting beverage is soy milk.

Referring to FIGS. 9a-9b, the device 50 comprises a container 51 configured to receive the water and the soybeans/soaked soybeans. The configuration of the container 51 may be the same as that of the container 11, which will not be described here for the sake of simplicity.

The device 50 further comprises a first tank 521 configured to store water, and a first valve 531 arranged on the first tank 521 and configured to be controlled to open or close in order to allow water from the first tank 521 to flow into the container 51 or to prevent the water from flowing into the container 51.

The device 50 further comprises a second tank 522 configured to store soybeans or soaked soybeans, and a second valve 532 arranged on the second tank 522 and configured to be controlled to open or close in order to allow the soybeans or soaked soybeans from the second tank 522 to enter the container 51 or to prevent the soybeans or soaked soybeans from entering the container 51.

The device 50 further comprises a grinding mechanism 54 configured to grind the soybeans in the container 51 to produce the soy milk. The configuration of the grinding mechanism 54 may be the same as that of the grinding mechanism 14, which will not be described here for the sake of simplicity.

The device 50 further comprises a first heating unit 55 configured to heat the soy milk in the container 51. The configuration of the first heating unit 55 may be the same as that of the first heating unit 15, which will not be described here for the sake of simplicity.

Advantageously, the device 50 may further comprise a controller 56. The controller 56 is configured to respectively control the first valve 531 to open or close in order to allow the water from the first tank 521 to flow into the container 51 or to prevent the water from flowing into the container 51, and control the second valve 532 to open or close in order to allow the soybeans or soaked soybeans from the second tank 522 to enter the container 51 or prevent the soybeans or soaked soybeans from entering the container 51. Furthermore, the controller 56 is further configured to control the operation of the grinding mechanism 54 and the first heating unit 55.

In this embodiment, during the operation of the device 50, the controller 56 may first control the second valve 532 to open in order to allow the soybeans or soaked soybeans from the second tank 522 to enter the container 51. Then, the controller 56 may further control the first valve 531 to open in order to allow the water from the first tank 521 to flow into the container 51. The water-adding process may be the same as that described in relation to device 10, which will not be described here for the sake of simplicity.

Figure 10:
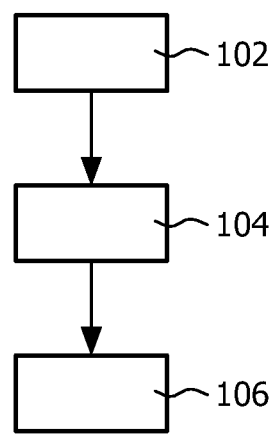
FIG. 10 shows a flow chart of a method of producing a beverage according to a further aspect of the disclosure.

According to a further aspect of the disclosure, there is provided a method of producing a beverage. FIG. 10 shows an exemplary embodiment of a flow chart of producing a beverage.

The method comprises a step S102 of introducing a first portion of solvent into a container stored with raw ingredients, the first portion of solvent having a first temperature; a step S104 of introducing a second portion of solvent into the container, the mixture of the first portion of solvent and the second portion of solvent having a second temperature that is lower than the first temperature; and a step S106 of grinding the raw ingredients together with the mixture of the first portion of solvent and the second portion of solvent to generate the beverage.

The raw ingredients may for example be soybeans, black soybeans, a mixture of soybeans and vegetables, a mixture of soybeans and fruits, a mixture of soybeans and grains, or any combination of those ingredients. The solvent may for example be water, mineral water, tap water, alkaline water, salted water, alcohol, or any combination of those solvents.

The first temperature may be in the range of [80° C., 100° C.] and the second temperature may be in the range of [40° C., 70° C.].

Advantageously, when the temperature of the first portion of water introduced into the container is lower than the first temperature, the step S102 of adding the first portion of solvent may further comprise a step of heating the first portion of solvent in the container to the first temperature.

Advantageously, after the step S102 of adding the first portion of solvent, the method may further comprise a step of grinding the raw ingredients together with the first portion of solvent.

Advantageously, after the step S106 of grinding, the method may further comprise a step of heating the beverage to a third temperature, for example 100° C.

It should be noted that the above described embodiments are given to describe the principles of the invention, not limit its scope; and it is to be understood that modifications and variations may be resorted to without departing from the spirit and scope of the invention, as those skilled in the art will readily understand. Such modifications and variations are considered to be within the scope of the invention and the appended claims. The scope of protection of the invention is defined by the accompanying claims. In addition, any of the reference numerals in the claims should not be interpreted as a limitation of the claims. The use of the verb "comprise" and its conjugations does not exclude the presence of elements or steps other than those stated in a claim. The indefinite article "a" or "an" preceding an element or step does not exclude the presence of a plurality of such elements or steps.

The invention claimed is:

1. A method of producing a beverage, the method comprising:
   bringing a first portion of solvent and a raw ingredient held in a container to a first temperature in a predetermined higher temperature range in which the raw ingredient has a lower solubility;
   performing an initial grinding of the raw ingredient together with the first portion of solvent for a first duration;
   introducing into the container a second portion of solvent having a temperature that will bring a mixture of the first portion of solvent, the raw ingredient and the second portion of solvent to a second temperature in a predetermined lower temperature range in which the raw ingredient has a higher solubility;
   completing grinding of the raw ingredient together with the mixture of the first portion of solvent and the second portion of solvent to produce the beverage.

2. The method of claim 1 where the duration of the initial grinding of the raw ingredient performed is much shorter than a duration needed to complete the grinding of said raw ingredient.

3. The method of claim 1 where, in the step of introducing the first portion of solvent into the container, said first portion of solvent is heated to the first temperature.

4. The method of claim 1 where, after completing grinding of the raw ingredient, the beverage is heated to a third temperature.

5. The method of claim 1 where the raw ingredient comprises soybeans, the solvent comprises water, the first temperature is in the range of 80° C.-100° C. and the second temperature is in the range of 40° C.-70° C.

6. A device for producing a beverage, the device comprising:
   a container configured to receive raw ingredients;
   a solvent provider arranged on the container and configured to provide solvent to the raw ingredients in the container;
   a valve arranged on the solvent provider and configured to be controlled to open or close in order to allow the solvent from the solvent provider to flow into the container or to prevent the solvent from flowing into the container;
   a grinding mechanism configured to grind the raw ingredients in the container to produce the beverage; and
   a first heating unit configured to heat the beverage;
   where the valve is configured so as to be controlled to open in order to allow a first portion of solvent from the solvent provider to flow into the container, the first portion of solvent having a first temperature, and then to be controlled to open to allow a second portion of solvent from the solvent provider to flow into the container, the mixture of the first portion of solvent and the second portion of solvent having a second temperature that is lower than the first temperature; and
   where the grinding mechanism is configured to grind the raw ingredients after the second portion of solvent has been allowed to flow into the container so as to produce the beverage.

7. The device of claim 6, wherein the grinding mechanism is further configured to grind the raw ingredients after the first portion of solvent has been allowed to flow into the container.

8. The device of claim 6, wherein when the temperature of the first portion of solvent from the solvent provider is lower than the first temperature, the first heating unit is further configured to heat the first portion of solvent in the container to the first temperature.

9. The device of claim 6, wherein when the temperature of the first portion of solvent from the solvent provider is lower than the first temperature, the device further comprises a second heating unit configured to heat the first portion of solvent to the first temperature before the first portion of solvent from the solvent provider enters the container.

10. The device of claim 6, where the solvent provider comprises at least one of:
    a tank configured to store solvent; and
    an inlet configured to allow solvent from a solvent source to enter the container.

11. The device of claim 9 where the container comprises a cup and a cover arranged on the cup and a tank configured to store solvent is arranged so as to at least partially surround the cup.

12. A method of producing a beverage, the method comprising:
    bringing a first portion of solvent and at least one raw food ingredient having a higher solubility in a predetermined lower temperature range and having a lower solubility in a predetermined higher temperature range, both held in a container, to a first temperature in the predetermined higher temperature range;
    performing an initial grinding of the at least one raw food ingredient together with the first portion of solvent for a first duration;
    introducing a second portion of solvent into the container to form a mixture comprising the first portion of solvent, the second portion of solvent and the at least one raw food ingredient, said mixture having a second temperature in the predetermined lower temperature range;
    completing grinding of the at least one raw food ingredient together with the first portion of solvent and the second portion of solvent to produce the beverage.

13. A method as in claim 12 where the first portion of solvent is preheated before introducing said first portion of solvent into the container.

14. A method as in claim 12 where the first mixture is brought to the first temperature in the predetermined higher temperature range by heating said first mixture after introducing the first portion of solvent into the container.

15. A method as in claim 12 where the at least one raw food ingredient contains a lipoxygenase enzyme and the temperature of the first mixture is maintained within said higher temperature range for a duration sufficient to inhibit production of odors by reaction of said lipoxygenase.

16. A method as in claim 12 where the duration of the initial grinding of the at least one raw food ingredient performed is much shorter than a duration needed to complete the grinding of said at least one raw food ingredient.

17. A method as in claim 12 where the at least one raw food ingredient comprises soybeans, the first temperature is in the range of 80° C.-100° C. and the second temperature is in the range of 40° C.-70° C.

18. The device of claim 9 where the container comprises a cup and a cover arranged on the cup and a tank configured to store solvent is arranged in the cover.

19. The device of claim 9 where the container comprises a cup and a cover arranged on the cup and a tank configured to store solvent is arranged under the cover.

20. The device of claim 9 where the container comprises a cup and a cover arranged on the cup and an inlet arranged on the cup and configured to allow solvent from a solvent source to enter the container.

21. The device of claim 9 where the container comprises a cup and a cover arranged on the cup and an inlet arranged on the cover and configured to allow solvent from a solvent source to enter the container.

* * * * *